United States Patent [19]
Takaoka et al.

[11] Patent Number: 5,467,753
[45] Date of Patent: Nov. 21, 1995

[54] IGNITION TIMING CONTROL APPARATUS FOR INTERNAL COMBUSTION ENGINE OF VEHICLE

[75] Inventors: Atsushi Takaoka, Shizuoka; Kazuhiko Mizutani, Hamamatsu, both of Japan

[73] Assignee: Suzuki Kabushiki Kaisha, Shizuoka, Japan

[21] Appl. No.: 382,400

[22] Filed: Feb. 1, 1995

[30] Foreign Application Priority Data

Feb. 23, 1994 [JP] Japan ................................. 6-025355

[51] Int. Cl.$^6$ ........................................... F02P 5/15
[52] U.S. Cl. ............................................... 123/418
[58] Field of Search ................................ 123/418, 419, 123/422, 423

[56] References Cited

U.S. PATENT DOCUMENTS

| | | | |
|---|---|---|---|
| 4,844,026 | 7/1989 | Tomisawa | 123/419 |
| 5,042,446 | 8/1991 | Hosowari et al. | 123/422 |

*Primary Examiner*—Andrew M. Dolinar
*Attorney, Agent, or Firm*—Ronald P. Kananen

[57] ABSTRACT

An ignition timing control apparatus for an internal combustion engine of a vehicle includes a detector connected to an internal combustion engine for detecting a revolution number of the internal combustion engine and a control unit operatively connected to the detector for controlling an ignition timing period in accordance with the detected revolution number of the internal combustion engine, the control unit being connected to an ignition unit connected to the internal combustion engine. The control unit includes an element for discriminating that the internal combustion engine is now in a steady operation state in a case where the detected engine revolution number is maintained by a predetermined time interval within a predetermined engine revolution number variation range and an element for setting, to the internal combustion engine, the ignition timing period for preventing irregular combustion and knocking when it is discriminated that the internal combustion engine is in the steady operation period and for setting, to the internal combustion engine, the ignition timing period satisfying an output requirement when it is discriminated that the internal combustion engine is out of the steady operation period.

2 Claims, 4 Drawing Sheets

IGNITION TIMING CONTROL APPARATUS FOR INTERNAL COMBUSTION ENGINE OF VEHICLE

BACKGROUND OF THE INVENTION

The present invention relates to an ignition system for an internal combustion engine and, more particularly, to an ignition timing control apparatus for an internal combustion engine of a vehicle which has a compact structure and is particularly effective for a two-stroke-cycle internal combustion engine, and which is also applicable to a vehicle having two wheels or four wheels and any other vehicle.

In an internal combustion engine, particularly two-stroke cycle internal combustion engine, an ignition timing satisfying an output requirement of the internal combustion engine with respect to an ignition timing control is ordinarily set. The ignition timing satisfying the output requirement is set, for example, as ignition timing IG/T in an advance angle with respect to a revolution number $N_e$ of the internal combustion engine as indicated by the solid line in FIG. 5.

However, during an operation at which a certain number of revolutions of the internal combustion engine is maintained (steady operation state), a restriction occurs due to irregular combustion or knocking. The steady operation has, with respect to the internal combustion engine revolutions $N_e$, an ignition timing region, such as that represented by the hatched area A in FIG. 5, in which an irregular combustion occurs, and another ignition timing range, such as that represented by the hatched area B, in which a knocking occurs.

Accordingly, in the case of an ignition timing characteristic satisfying an output requirement, undesirable phenomena such as irregular combustion and/or knocking take place during the steady operation in an actual vehicle traveling. In addition, an irregular pulsation which occurs during steady traveling of a vehicle affects as a hindrance to make smooth the operation thereof.

Ordinarily, such undesirable phenomena as irregular combustion and knocking during the steady operation as described above can be improved or reduced by setting a lag of the ignition timing. In the conventional techniques, therefore:

(1) it has been practiced that the ignition timing is set with a lag in angle both during the steady operation and the accelerating operation such that a condition in a region represented by each of the hatched areas A and B in FIG. 5, in which the irregular combustion or knocking occurs, is avoided, and such that the output requirement is sacrificed; and (2) it is also known that a knocking detecting sensor is provided and a knock signal from the knocking detecting sensor is fed back to set a lag in angle of the ignition timing (see, for example, Japanese Patent Laid-Open Publication No. 180771/1983).

In the above-described technique (1) entails a reduction in output (also in thermal efficiency) and is, therefore, not preferable. In particular, there is a problem of the output being reduced even during the acceleration requiring a certain output.

The above-described technique (2) realizes an improved system, but entails the problems of the construction being complicated and an increase in cost.

With respect to the ignition timing control for internal combustion engines, it has been also proposed that the ignition timing is controlled according to the intake air flow rate and the throttle opening for fuel supply of the engine as well as the revolution number of the internal combustion engine (Japanese Patent Laid-Open No. 279270/1987). However, this technique also entails problems of the system being complicated and an increase in cost.

SUMMARY OF THE INVENTION

An object of the present invention is to substantially eliminate defects or drawbacks encountered in the prior art or technique described above and to provide an ignition timing control apparatus for an internal combustion engine of a vehicle which is simple in construction and has a cost improvement, and which can be designed to improve the performance both during the steady operation and the acceleration/deceleration operation of the engine.

This and other objects can be achieved according to the present invention by providing an ignition timing control apparatus for an internal combustion engine of a vehicle, comprising:

a detection means connected to an internal combustion engine for detecting a revolution number of the internal combustion engine; and a control means operatively connected to the detection means for controlling an ignition timing period in accordance with the detected revolution number of the internal combustion engine, the control means being connected to an ignition unit connected to the internal combustion engine, the control means including an element for discriminating that the internal combustion engine is now in a steady operation state in a case where the detected engine revolution number is maintained by a predetermined time interval within a predetermined engine revolution number variation range and an element for setting, to the internal combustion engine, the ignition timing period for preventing irregular combustion and/or knocking when it is discriminated that the internal combustion engine is in the steady operation period and for setting, to the internal combustion engine, the ignition timing period satisfying an output requirement when it is discriminated that the internal combustion engine is out of the steady operation period.

The detection means, the control means and the ignition unit are assembled in one capacitive discharge ignition unit.

According to the present invention of the characters described above, the steady operating state is determined from a state where the revolution number of internal combustion engine is maintained within a predetermined variation range for a predetermined time period, thus being possible to use a simple construction requiring no knock detection sensor or the like to prevent the irregular combustion and the knocking during the steady operation period when an operation for preventing the irregular combustion and the knocking is required.

In states other than the steady operating state, an ignition timing satisfying an output requirement is set for the internal combustion engine, thereby satisfying an output demand during the accelerating operation requiring a certain output.

The nature and further features of the present invention will be made more clear from the following descriptions made in conjunction with the accompanying drawings.

DESCRIPTION OF THE PREFERRED EMBODIMENT

An embodiment of the present invention will be described hereunder in detail with reference to the accompanying drawings.

Figure 1:
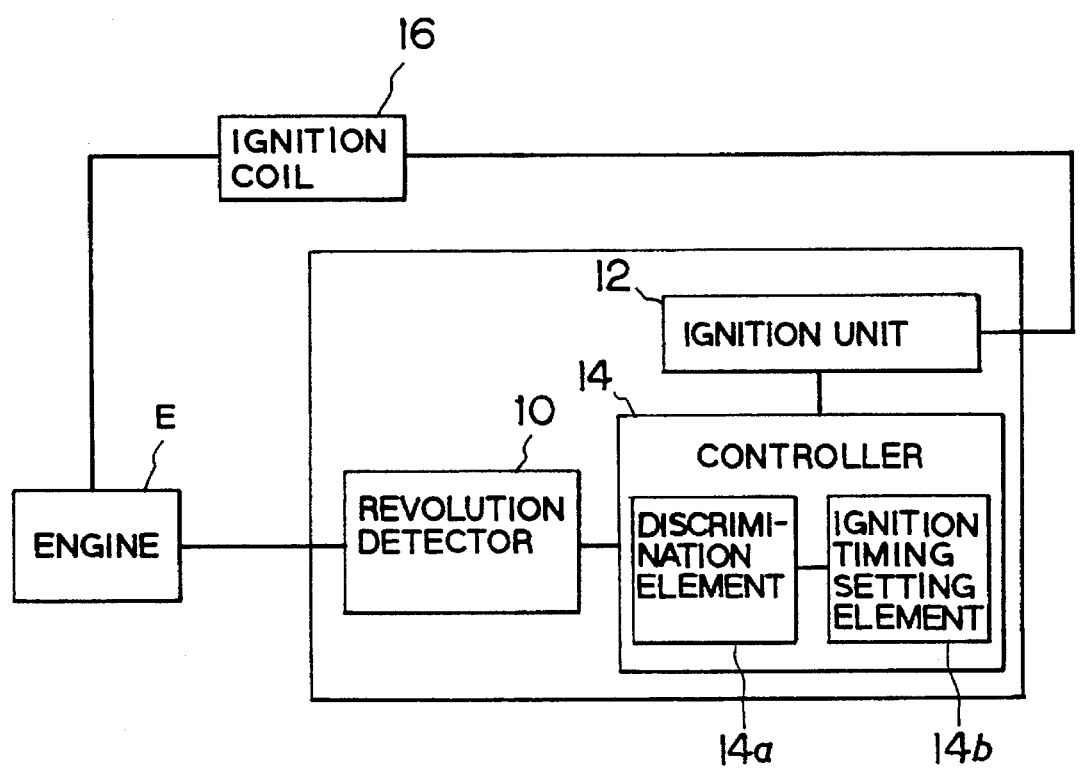
FIG. 1 is a system diagram of an ignition timing control apparatus in accordance with an embodiment of the present invention.

Referring to FIG. 1, the ignition timing control apparatus of the embodiment is applied to a vehicle, for example, with a two-stroke-cycle internal combustion engine and is provided with an internal combustion engine E revolution detecting unit 10 for detecting the number of revolutions of the internal combustion engine E and an ignition unit 12 for igniting the internal combustion engine E. The ignition timing control apparatus is also provided with an operation control unit 14 which determines that the internal combustion engine is in a steady operation state when the detected revolution number is maintained in a predetermined revolution variation range for a predetermined period of time. The operation control unit 14 sets for the internal combustion engine an ignition timing for preventing irregular combustion and knocking when it is determined that the internal combustion engine E is in the steady operation state, and for setting an ignition timing satisfying an output requirement when it is determined that the internal combustion engine E is not in the steady operation state.

In the present embodiment, although a D.C.-CDI (capacitive discharge ignition) unit may be utilized for the detection unit 10, the ignition unit 12 and the operation control unit 14, a unit, for example, a CDI unit for detecting the number of revolutions of the internal combustion engine and for controlling ignition and ignition timing of the internal combustion engine can be used in place of these units 10, 12 and 14. The ignition unit 12 is operatively connected to the internal combustion engine E through, for example, an ignition coil 16.

Figure 2:
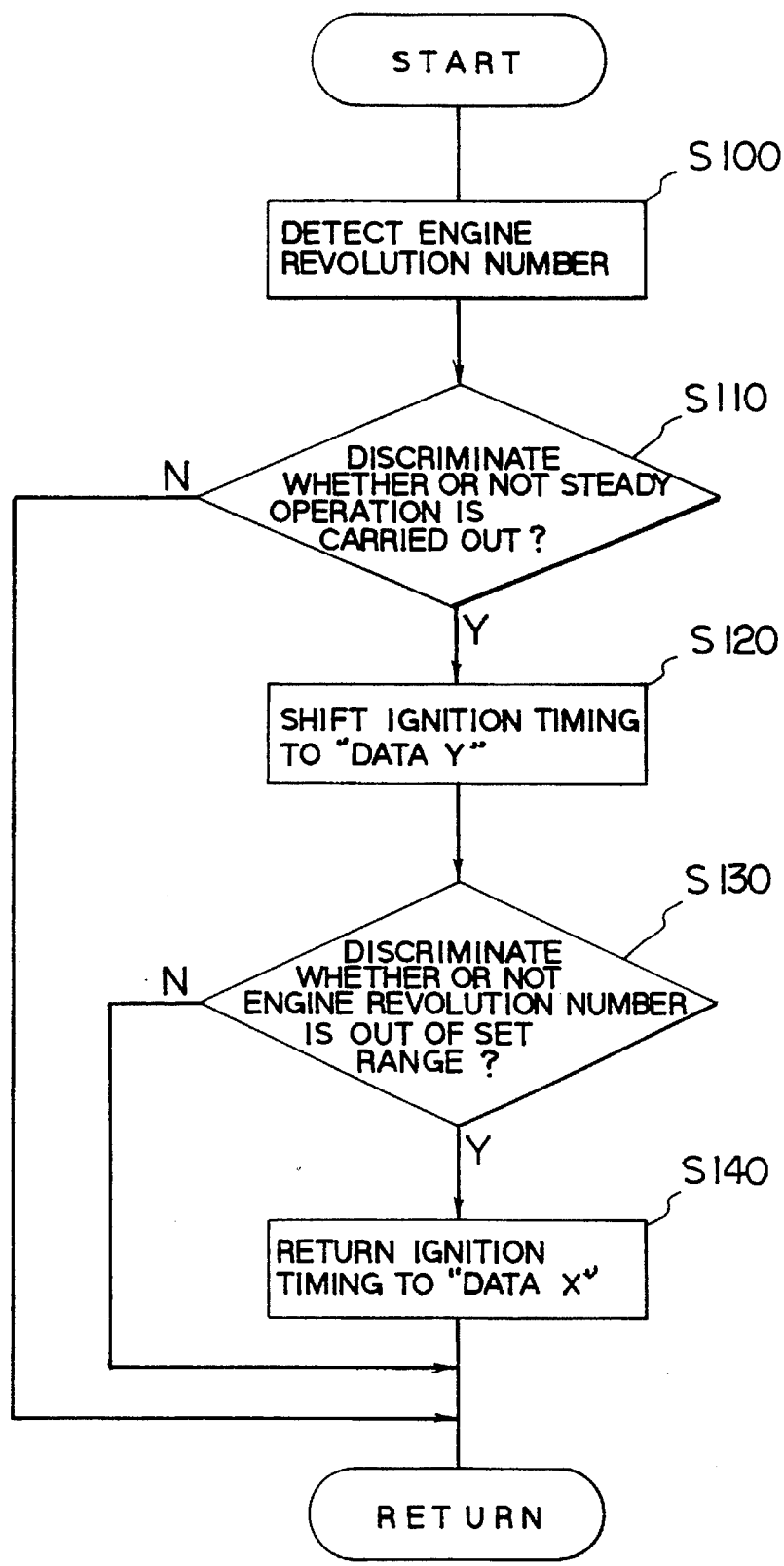
FIG. 2 is a control flowchart of the control apparatus of FIG. 1.
Figure 3:
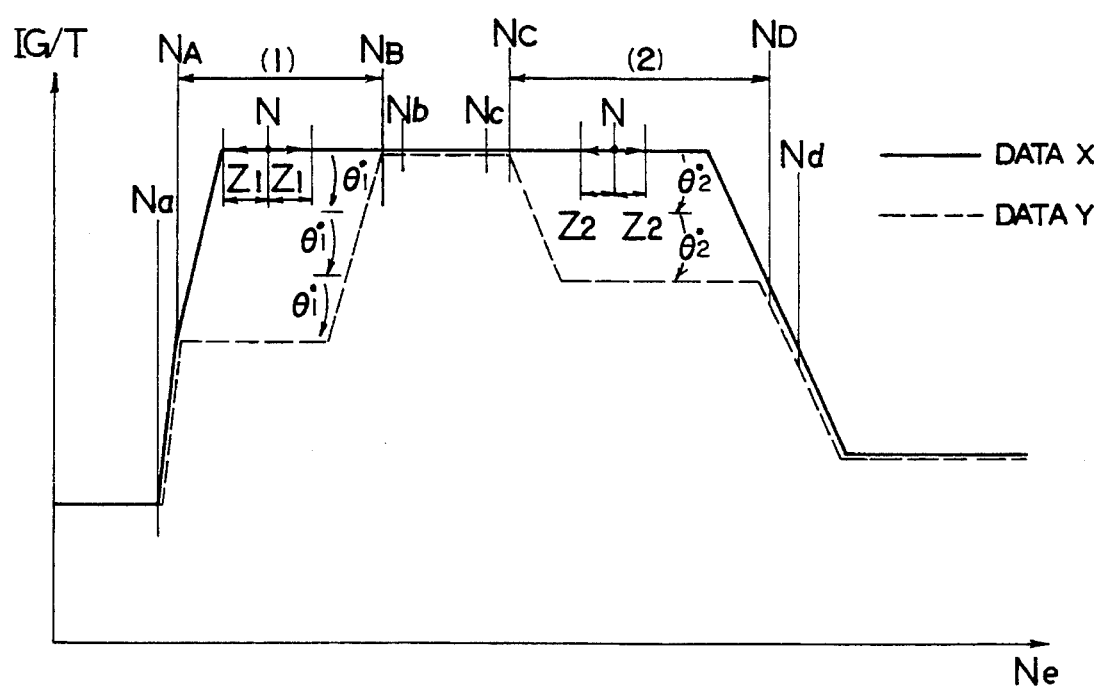
FIG. 3 is a diagram of ignition timing data of the control apparatus of FIG. 1.
Figure 4:
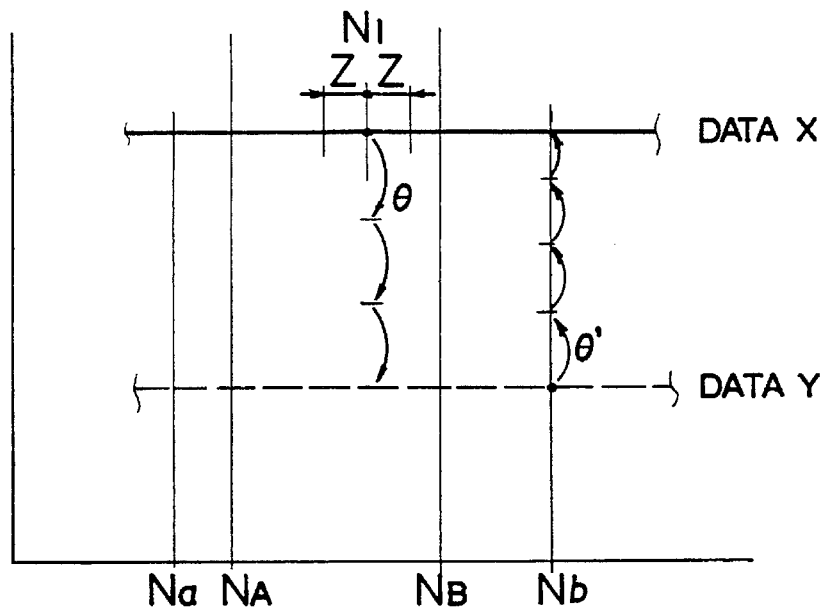
FIG. 4 is a diagram for explaining changes in ignition timing.
Figure 5:
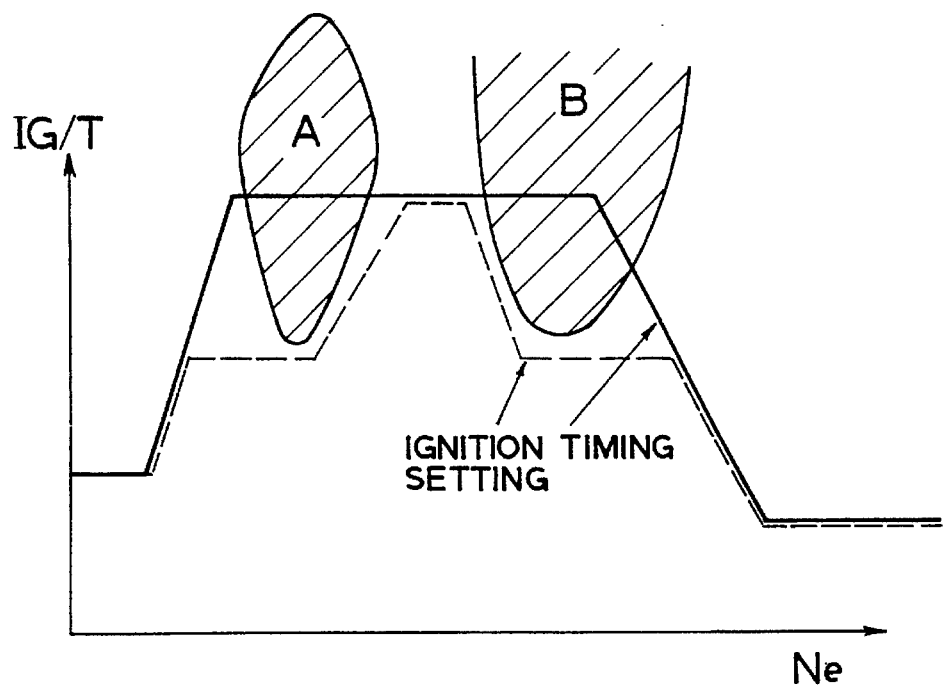
FIG. 5 is a diagram for explaining the ordinary ignition timing control for an internal combustion engine.

The operation control unit 14 performs an ignition timing control in accordance with the flowchart shown in FIG. 2 and controls the ignition timing based on the control data shown in FIG. 3, in which, "data X" indicated by the solid line represents an ignition timing characteristic satisfying an output requirement and "data Y" indicated by the broken line represents an ignition timing characteristic selected by considering a restrictive condition (a lag of the ignition timing which will become necessary for preventing irregular combustion and knocking during the steady operation). The "data X" is used during the acceleration and deceleration while "data Y" is used during the steady traveling operation. There are ranges of revolution numbers requiring "data Y" which are (1) ($N_A \sim N_B$) and (2) ($N_C \sim N_D$).

In the above meanings, it will be said that the operation control unit 14 at least includes an element 14a for discriminating that the internal combustion engine is now in the steady operation state in a case where the detected revolution number is maintained by a predetermined time interval within a predetermined revolution number variation range and an element 14b for setting the ignition timing period for preventing the irregular combustion and/or knocking when discriminated as the steady operation period and for setting the ignition timing period satisfying the output requirement when discriminated as no steady operation period. Of course, a central processing unit CPU may be incorporated in the operation control unit 14 in association with the discrimination element 14a and the ignition timing setting element 14b.

The ignition timing control in the ignition timing control apparatus of this embodiment will now be described with reference to the flowchart of FIG. 2.

In Step 100, the revolution number $N_e$ of internal combustion engine E detected by the internal combustion engine revolution detecting unit 10 is input to the operation control unit 14 (S100). In Steps 110 to 140, the ignition timing control in the operation control unit 14 is performed (S110–S140) in the following manner.

When the revolution number $N_e$ of the internal combustion engine falls into the range (1) ($N_A \leq N_e \leq N_B$), the operation control unit 14 makes a determination as to whether the revolution number $N_e$ of internal combustion engine is maintained within an arbitrary revolution variation range ($Z_1$) for an arbitrary time period ($T_1$) to make a determination as to whether or not the steady operation is being performed.

When the revolution number $N_e$ of the internal combustion engine falls into the range (2) ($N_C \leq N_e \leq N_D$), the operation control unit 14 makes a determination as to whether the revolution number $N_e$ of the internal combustion engine is maintained within an arbitrary revolution variation range ($Z_2$) for an arbitrary time period ($T_2$) to make a determination as to whether or not the steady operation is being performed (Step 110).

Revolution variation ranges Z ($Z_1$, $Z_2$) and maintenance times T ($T_1$, $T_2$) may be arbitrarily set with respect to different internal combustion engines. A condition that "±Z (rpm) ranges are satisfied for T (seconds)" is used as a steady operation determination criterion.

When it is determined that the steady operation is being performed, the step advances to the step S120, and the ignition timing characteristic is immediately shifted from "data X" toward "data Y" by arbitrary ignition timing angle ranges (θ°) (by angle θ° steps). This is done for the purpose of smoothly shifting the characteristic without any abrupt change. In the ranges (1) and (2), different or the same ignition timing angle ranges $\theta_1°$ and $\theta_2°$ are used. Needless to say, the ignition timing may be changed instantaneously from the "data X" to the "data Y" by using a timing angle range (θ°=∞).

In the step S120, after the shift of the ignition timing to the "data Y", the "data Y" is maintained until the revolution number $N_e$ of internal combustion engine is changed out of certain set ranges ($N_a \sim N_b$, $N_c \sim N_d$ (until $N_e < N_a$ or $N_b < N_e$ is satisfied after the revolution number $N_e$ has been in the range (1), or until $N_e < N_c$ or $N_d < N_e$ is satisfied after the $N_e$ has been in the range (2)).

Further, it is established that $N_a < N_A$, $N_B < N_b$, and $N_c < N_c$ or $N_D < N_d$, and then, $N_a \sim N_A$, $N_B \sim N_b$, or $N_C \sim N_C$, $N_D \sim N_d$ are provided on the outside of the range (1) or (2) for a hysteresis for smoothing the operation.

In the step 130, it is discriminated whether or not the revolution number $N_e$ is shifted out of the set range, that is, whether acceleration or decelation is started, and in the step 130 (S130), and in the case of "Yes (Y)", after the revolution number $N_e$ of internal combustion engine has been changed out of the set range (S140), the "data X" satisfying the output requirement is reset. As shown in FIG. 3, the resetting may be performed by arbitrary ignition timing ranges (θ') if there is a difference between the "data X" and the "data Y" when the revolution number $N_e$ of internal combustion engine is ($N_a$ or $N_b$), or ($N_c$ or $N_d$).

In the step S110, in the case of "No (N)", the step advances to the "return" or may return the step S100, and in the step S130, in the case of "No (N)", the step advances the "return" or may return to the step S110.

As described above, according to the embodiment of the ignition timing control apparatus, the structure thereof can be made simple, as shown in FIG. 1, and requires no specific parts, thus being advantageous and reduced in cost. Specifically, the present invention will be practiced comparatively easily if an existing CDI unit be used.

Thus, it is possible to minimize, in the use of a simple system, the sacrifice during the acceleration or deceleration period by coping the problems that arise only at the time when the steady operation is maintained.

In the above-described embodiment, the present invention is applied to two-stroke-cycle internal combustion engines. However, the present invention may also be applied to four-stroke-cycle internal combustion engines with substantially the same effects as those of the the described invention. The data shown in FIG. 3 is only an example of the set ignition timing data, and any other data may also be used. In the embodiment, the data is set for the purpose of preventing both the irregular combustion and knocking. However, the invention is not limited to this matter, and it is possible to set lag data for the purpose of either one of the irregular combustion and knocking.

Therefore, according to the present invention, as described above, the excellent effects or merits, such as simple construction, reduction in cost, and an improvement in performance both during the steady operation and the acceleration/deceleration operation, can be achieved.

What is claimed is:

1. An ignition timing control apparatus for an internal combustion engine of a vehicle, comprising:

a detection means connected to an internal combustion engine for detecting a revolution number of the internal combustion engine; and a control means operatively connected to said detection means for controlling an ignition timing period in accordance with the detected revolution number of the internal combustion engine, said control means being connected to an ignition unit connected to the internal combustion engine, said control means including an element for discriminating that the internal combustion engine is now in a steady operation state in a case where the detected engine revolution number is maintained by a predetermined time interval within a predetermined engine revolution number variation range and an element for setting, to the internal combustion engine, the ignition timing period for preventing irregular combustion and knocking when it is discriminated that the internal combustion engine is in the steady operation period and for setting, to the internal combustion engine, the ignition timing period satisfying an output requirement when it is discriminated that the internal combustion engine is out of the steady operation period.

2. The ignition timing control apparatus according to claim 1, wherein said detection means, said control means and said ignition unit is assembled in one capacitive discharge ignition unit.

* * * * *